Aug. 23, 1932.  E. J. SWEETLAND  1,873,795
OIL FILTER CONSTRUCTION
Filed Sept. 21, 1926   2 Sheets-Sheet 1
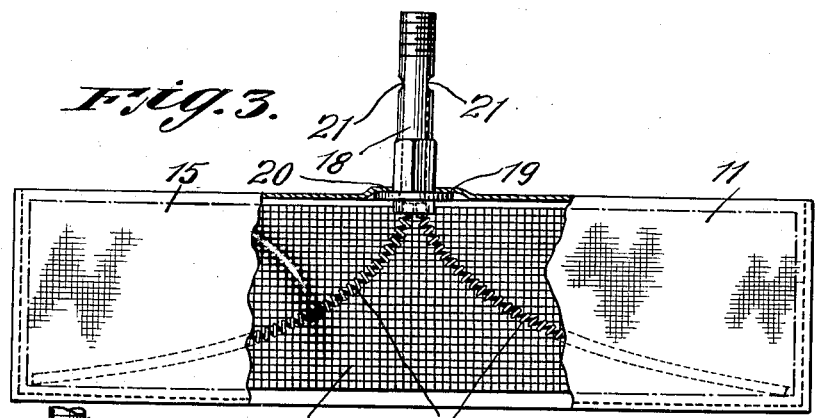
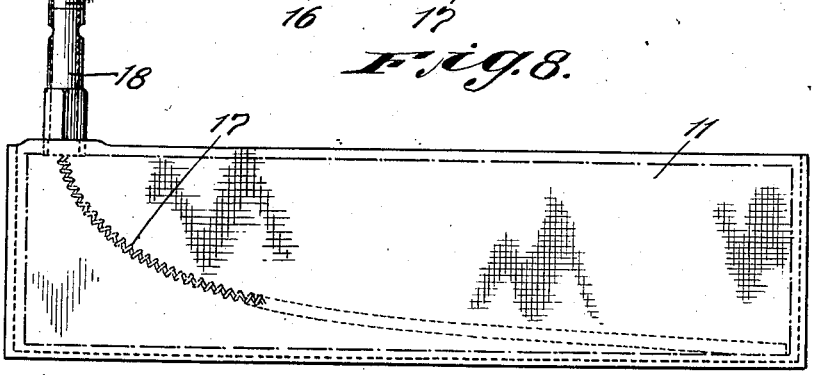
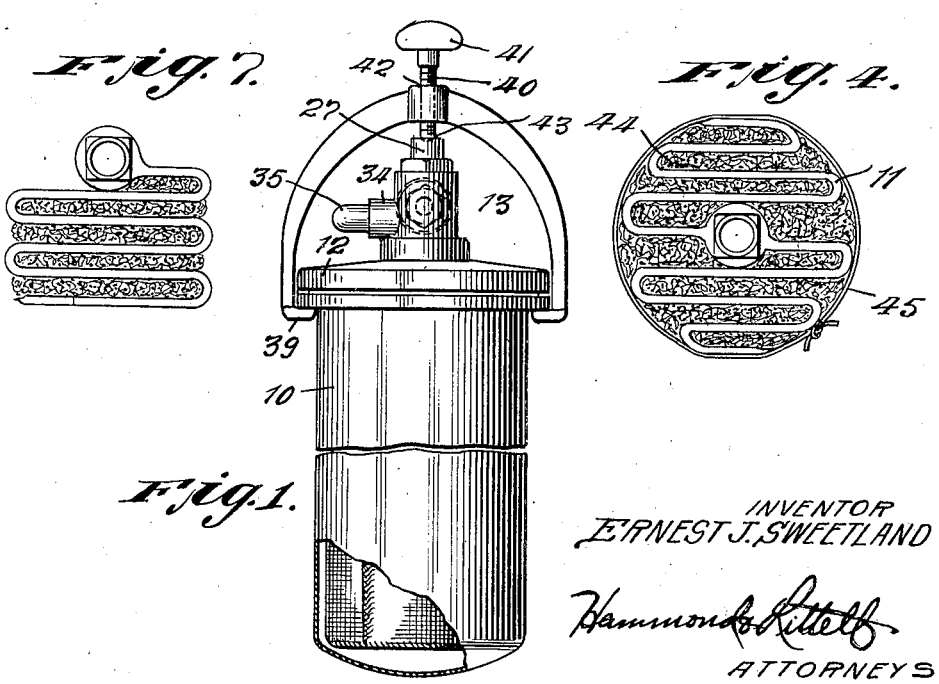
INVENTOR
ERNEST J. SWEETLAND
ATTORNEYS

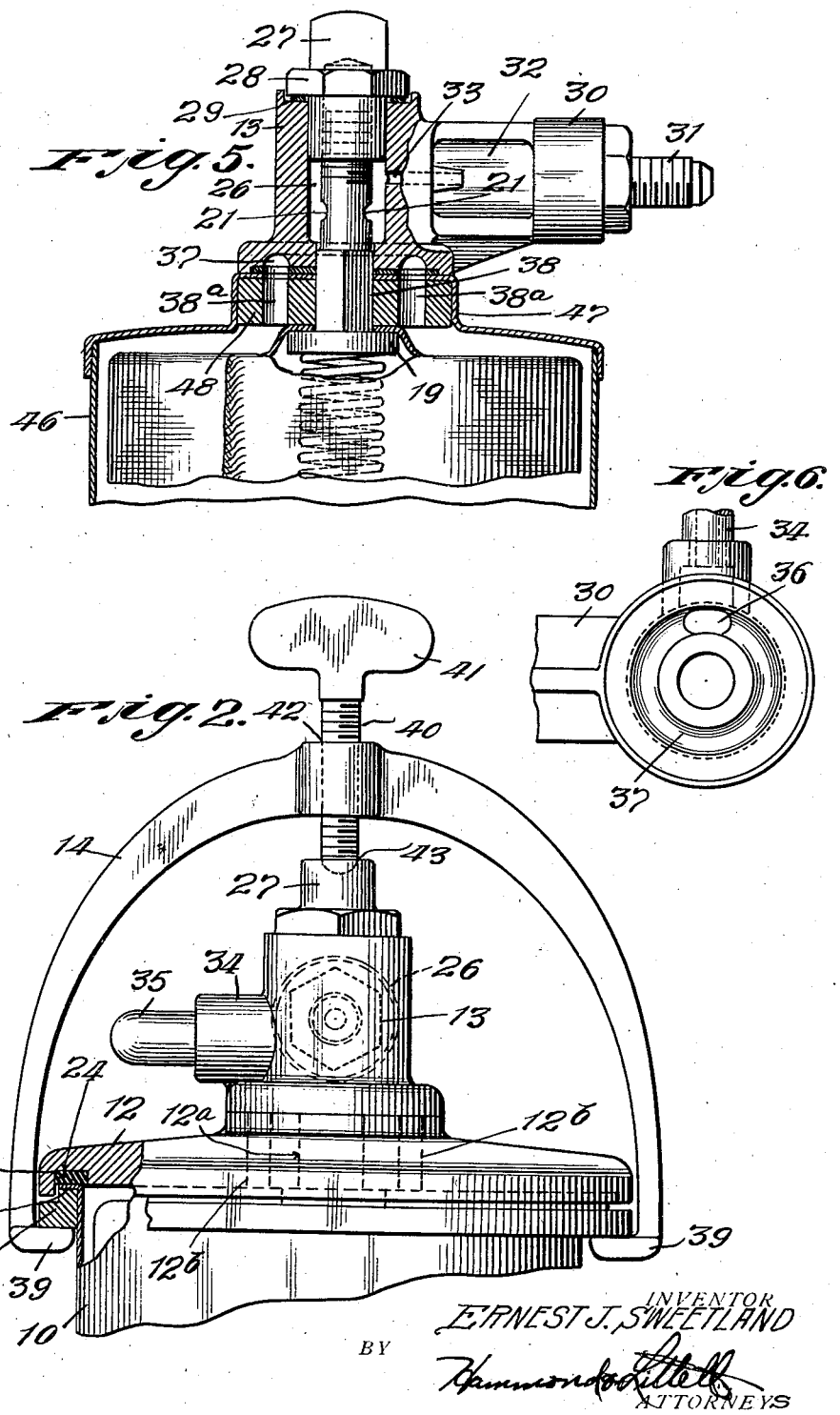

Patented Aug. 23, 1932

1,873,795

UNITED STATES PATENT OFFICE

ERNEST J. SWEETLAND, OF PIEDMONT, CALIFORNIA

OIL FILTER CONSTRUCTION

Application filed September 21, 1926. Serial No. 136,756.

This invention relates to oil filters for use in connection with the lubricating system of automotive internal combustion engines.

One of the objects of the invention is to provide an oil filter casing with a renewable filter element therein and to provide an easy means for opening the casing to permit the removal or replacing of filter element therein.

Another object of the invention is to provide an improved joint between the separable parts of the casing or container, which will permit of easy opening of the container and still provide a leak-proof connection when closed.

Another object of the invention is to provide a drainage member for the filter elements which may be readily folded or rolled with the filter element, and which will provide better drainage throughout the length of the element.

Another object of the invention is to provide a container and filter element which may be manufactured at low cost without sacrifice to the efficiency of the filter so that container may be opened and filter element may be thrown away when it has become clogged and no longer efficient, and a new element provided at a low cost or the container and element discarded as a unit and replaced by a new container and element.

Various other objects of the invention will be apparent as the description of the invention proceeds.

In the accompanying drawings, in which one form of embodiment of the invention has been illustrated:

Fig. 1 is a side elevation of a filter embodying my invention.

Fig. 2 is an enlarged detail view of the upper portion of the filter shown in Fig. 1.

Fig. 3 is an elevation of one form of filter element used in the filter of Fig. 1, portions of the filter cloth being broken away to show details of the interior construction.

Fig. 4 is a plan view of the element shown in Fig. 3, folded into position and ready to be placed in the container.

Fig. 5 is a sectional view of the outlet and inlet fitting applied to a sealed filter casing.

Fig. 6 is a bottom view of the fitting shown in Figures 1, 2 and 5.

Fig. 7 is a plan view of a modified filter element with the drainage member at the end instead of at the center thereof.

Fig. 8 is an elevation of the filter element shown in Fig. 7, in unfolded position.

Referring more specifically to the drawings, the filter comprises a casing 10, a head 12, an outlet and inlet fitting 13, and a yoke 14, to hold the fitting, head and casing together.

The filter element 11, which is located in the casing 10, comprises an envelope, or bag, of filter cloth 15, a drainage lining 16, of coarse burlap or other spaced flexible material, coiled drainage springs 17 and a drainage tube 18. The drainage tube 18 provides an outlet for the filtrate from the filter element 11, and also a means for attaching the filter element to the outlet fitting on the casing.

A collar or flange 19, near the bottom of the drainage tube 18 provides a shoulder upon which the filter cloth rests and which in conjunction with the head of the casing provides a seal for the edges of the cloth. The drainage tube 18 is adapted to be inserted in the hole 20, in the center of a rectangular sheet of filter cloth and the sheet of filter cloth folds over and is sewed along the edges to form the envelope 11.

The springs 17 may be attached to the lower part of the drainage tube 18 and may be led to the extreme ends of the envelope 11, to space the sides of the filter bags apart and to provide a drainage channel from each end thereof to the drainage tube 18. A strip of drainage, or spacing material of the flexible, loosely woven cloth, burlap, screen wire or the like, is placed on each side of the springs 17, and the edges of the filter cloth sewed, forming a sealed envelope. The drainage tube 18 is square in cross sections adjacent the filter cloth and round and threaded at the upper end thereof to engage the nut associated with the outlet fitting. A plurality of holes 21 in the sides of the drainage tube 18 permit the filtrate to flow out of the drainage tube and thence away from the filter.

The container for the filter element comprises a casing 10, preferably pressed out of sheet metal and having a flange 22 extending outwardly toward the upper edge thereof. A ring 23, is adapted to fit around the casing 10 beneath and adjacent to the flange 22. The head 12 has an annular groove 24 around the edge of the bottom face thereof and a packing 25 is disposed within the groove 24. A square hole 12a passes through the center of the head 12 and a plurality of smaller holes 12b are spaced in a circle around the square hole. The drainage tube 18 is adapted to be inserted in the square hole in the head 12, the square portion of the tube 18 fitting therein so that rotation is prevented, but the end of the drainage tube 18 is free to be drawn up through the head 12. An inlet and outlet fitting 13 is adapted to rest upon the head 12. An opening 26 thru the centre of the fitting 13 is adapted to fit over the end of the drainage tube 18. A nut 27 fits rotatably within the opening 26, and has a rim 28 of larger diameter than the opening 26, which bears against the top of the fitting 13, and seals the opening 26 by means of a gasket 29, which is placed between the fitting and the rim 28. The nut 27 is internally drilled and tapped to engage the threaded end of the drainage member 18 and draw the same up into the fitting when the nut 27 is turned.

An extended portion 30 on the side of the fitting 13 holds the outlet nozzle 31 for the fitting and is bored to receive a sight glass 32 through which the oil may be seen as it leaves the filter. A hole 33 provides communication between the opening 26 and the fitting and the sight glass 32. A second extended portion 34 on the side of the fitting 13 supports an inlet nozzle 35. The portion 34 is bored out to receive the nozzle 35 and a hole 36 communicates with an annular groove 37 in the bottom face of the fitting. The groove 37 is spaced from the center of the fitting so that it will register with the plurality of holes 12b which pass through the head 12. It will be understood that in use the inlet 35 and the outlet 31 are connected with the lubricating system so as to receive dirty oil from the crank case through the inlet 35 and return clean oil to the crank case through the outlet 31. The yoke 14 has fingers 39 at the ends thereof, which engage the under side of the ring 23. A screw 40 having a winged head 41 passes thru the top hole 42 in the center of the yoke 14 and bears against the nut 27, which may have a depression 43 to receive the end thereof. When the screw 40 is turned downwardly by means of the winged head 41, the yoke 14 and ring 23 are drawn upwardly thereby bringing the flange 22 of the casing 10 tightly against the packing 25 and the head 12, to provide a liquid tight joint. To separate the head from the casing, it is only necessary to loosen the screw 40, and the yoke is lowered, releasing the ring 23 and the casing 10, so that the ring 23 and yoke 14 may be removed.

The ends of the filter envelope 11 may be folded back and forth as shown in Figure 4, to conform to the size and shape of the container, which for purposes of illustration has been shown cylindrical. The folds of the envelope 11 are spaced apart by spacing material 44, composed of excelsior, moss, hair or any similar fibrous material, and the elements may be held in such folded position by a string 45 passing around the same, or the filter element may be wound spirally around the drainage tube 18, as described in my co-pending application No. 136,757 filed September 21, 1926, now Patent No. 1,825,983, issued October 6, 1931.

The oil enters the filter thru the inlet nozzle 35, passing thru the extended portion 34, down thru the opening 36, into the groove 37, thru the holes 12b into the casing 10 and around the filter element, passing readily thru the spacing material 44, and contacting with the surface of the filter element. The pure oil passes thru the filter cloth into the inside of the element leaving the dirt and other sediment upon the surface of the filter cloth. The filtrate then passes along the threads of the drainage lining of burlap, until it strikes one of the spring drainage members 17, whereupon it passes thru a channel formed by the spring to the drainage tube 18, out thru holes 21 into the opening 26 of the fitting 13, thru the hole 33 into the sight glass 32, and out thru the nozzle 31. When the filter becomes clogged due to the accumulation of sediment on the surface of the bag 11, the casing 10 and head 12 may be separated and the filter element detached from the head by removal of the nut 27 and discarded, and a new element inserted in lieu thereof.

In Fig. 5, a sealed container 46 is illustrated attached to the fitting 13 in place of the casing 10 and the head 12 shown in Fig. 2. This container 46 has a protruding portion 47, in the top thereof. A supporting block 48 fits within the extended portion 47 and forms the seat for the fitting 13, and the shoulder 19 on the filter element.

The holes 38 and 38a are provided in the supporting block 48, similar to the holes 12a and 12b in the head 12, and the fitting 13 is attached to the container 46 similarly to the manner in which it is attached to the head 12 by the nut 27 engaging the drainage member 18 of the filter element.

In this modification of the invention, the casing 46 is sealed and cannot be opened without destroying the same, and in changing filters, the filter element and casing is designed to be thrown away together, when the filter element becomes clogged and inefficient.

In changing this filter unit the nut 27 is removed, casing 46 together with the element therein discarded, and a new casing and element attached to the fitting by turning the nut 27. While I have described the filter element as having a drainage member connected at the center and the ends folded back and forth to conform to the shape of the filter casing, it is to be understood that the drainage member may be connected to the end of the filter element if desired, and the filter be folded back and forth to conform to the desired shape. In this case only one spring drainage member 17 will be used extending substantially the length of the filter envelope diagonally from one corner to the other, as illustrated in Fig. 7.

Various modifications and changes in the embodiments of the invention as shown in the accompanying drawings may be resorted to without departing from the spirit of the invention or the scope of the appended claims.

I claim:

1. In a filter, a container comprising a casing, a head for said casing and single means to releasably secure said head to said casing, a filter element comprising an envelope of filter cloth, a drainage lining of coarse flexible woven material, a tubular drainage member, within said envelope, an outlet connection attached to said drainage member, the ends of said envelope being folded to conform to the shape of said container, flexible spacing material between the folds of said envelope to separate portions of said envelope from each other, means to secure said envelope in folded position, and means to support said filter element within said casing and spaced from the sides thereof.

2. In a filter, a container, a filter element within said filter container, comprising an envelope of filter cloth, a drainage lining of coarse flexible woven material, a flexible tubular drainage member within said envelope, an outlet connection attached to said drainage member, said envelope being folded back and forth to conform to the shape of said container, flexible spacing material between the folds of said envelope to space the same apart, means to secure said envelope in folded position and means to support said filter element within said container and spaced from the sides thereof.

3. In a filter, a container, a closure member therefor, a filter element within said container comprising an envelope of filter cloth, a flexible drainage lining within said envelope, a flexible drainage member composed of a coiled wire within said envelope, a tubular outlet fitting attached to said member and supporting said filter element, said filter element being folded to fit within said container and a porous bulky material spacing the folds of filter element.

4. A filter element comprising an envelope of filter cloth, a drainage lining within said envelope, a plurality of flexible tubular drainage members within said envelope extending from the ends to the center thereof, an outlet fitting attached to said envelope and communicating with said drainage members, said envelope folded back and forth to form an element substantially cylindrical in shape, a flexible spacing material between the folds of said envelope and means to secure said envelope in folded condition.

5. In a filter, a casing, a filter element within the casing, detachably secured to the top of said casing, said filter element comprising a rectangular shaped envelope of filter material, an outlet tube for filtrate through said envelope, a flexible tubular drainage member extending through said outlet to an end of said envelope, said envelope adapted to be folded to fit within said casing and a fibrous material adapted to be placed between the folds of said filter element to space the folds one from the other.

6. A filter of the class described comprising a container, a filter element within the container, an outlet fitting in the container adapted to detachably support the filter element within the container, a drainage member within said filter element and secured to said outlet fitting to receive the filtrate from the filter element, said drainage member extending to an end of said filter element, said filter element adapted to be folded to fit within said container and a fibrous bulky material placed between the folds to space said folds one from the other.

7. In a filter, a casing, a spiral filtering unit comprising a drainage member enclosed in an envelope of filtering cloth, a conduit leading from said unit, and means on said conduit and in said casing for gripping that portion of the filter cloth adjacent the aperture through which the conduit passes.

8. The combination in an oil filter of a flexible folded envelope of filtering material, a flexible drainage and spacing member in said envelope, a drainage tube extending from the interior to the outside of said envelope, and a fibrous spacing material between the folds of said envelope.

In testimony whereof I have affixed my signature to this specification.

ERNEST J. SWEETLAND.